UNITED STATES PATENT OFFICE.

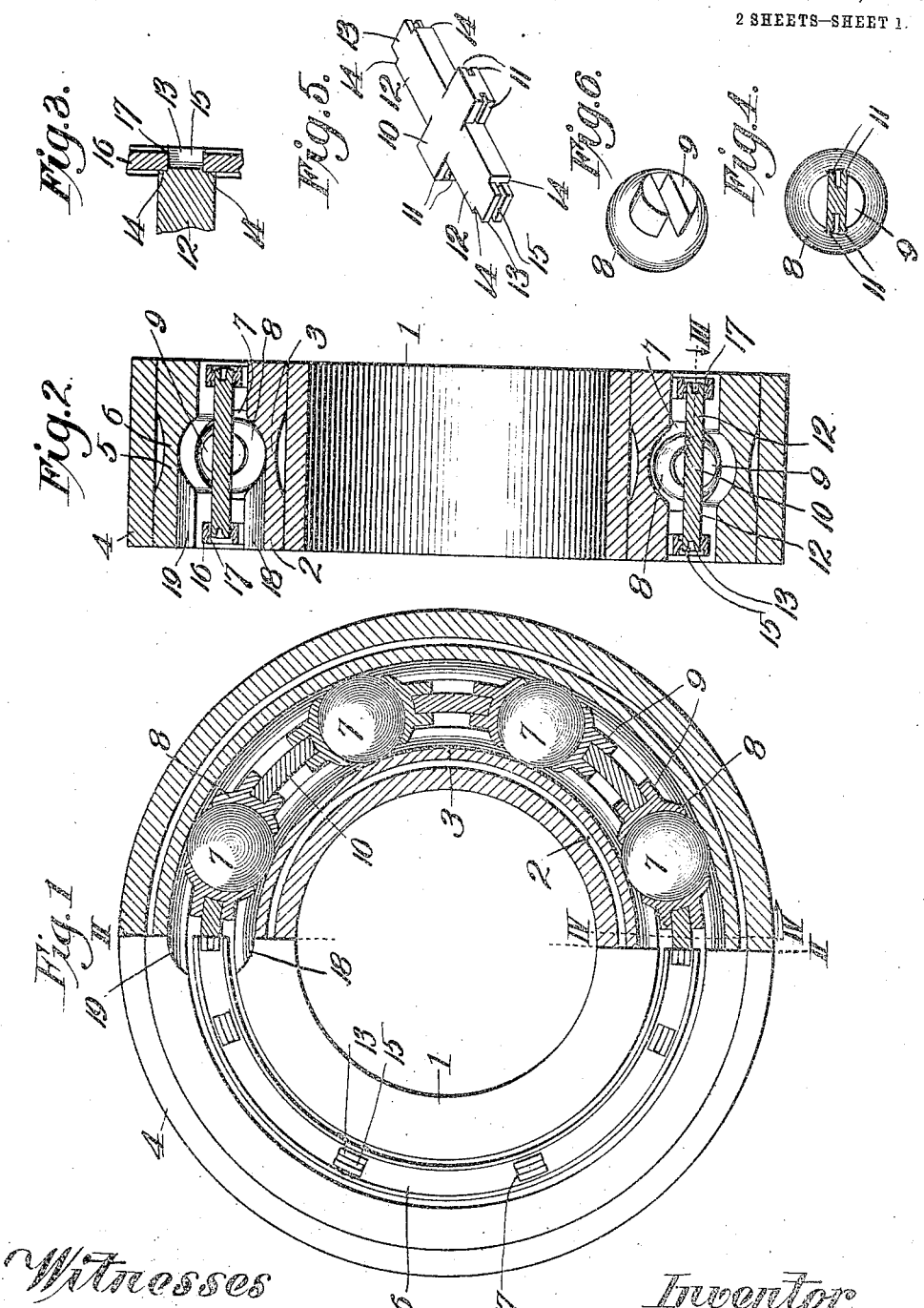

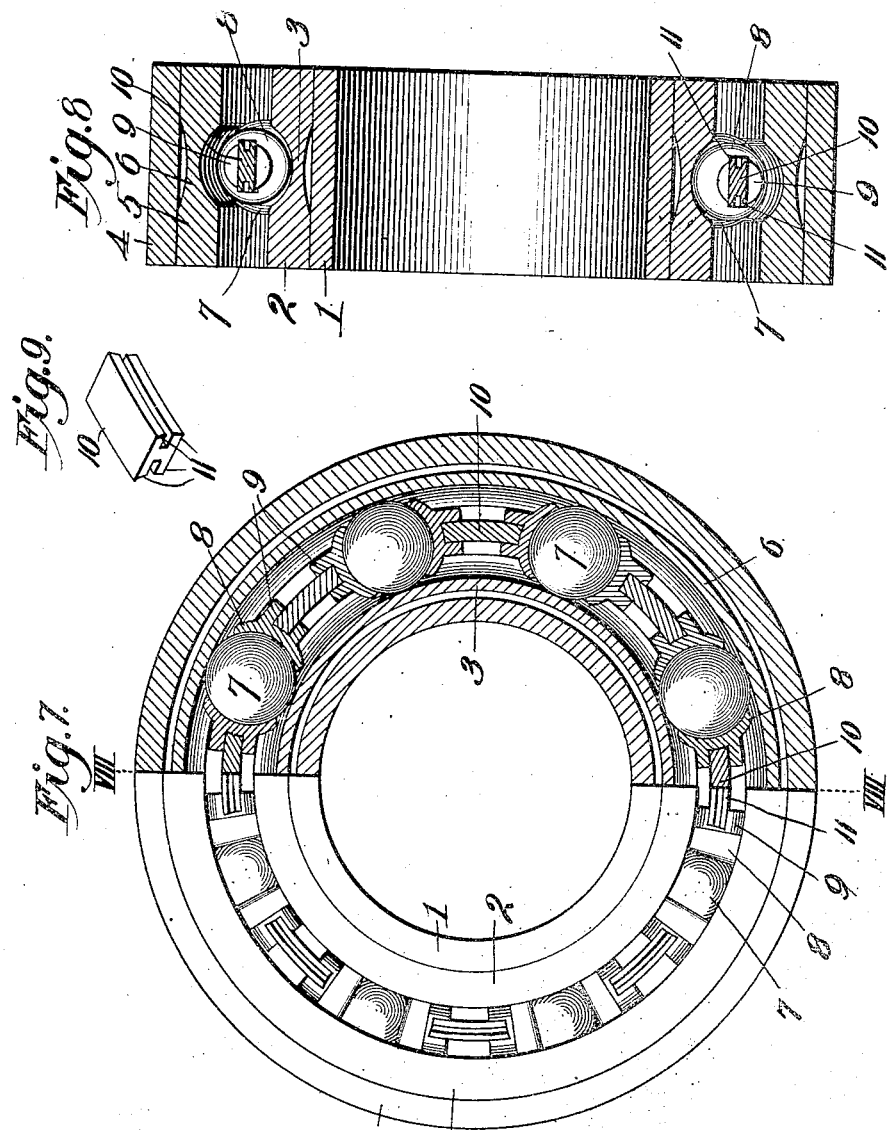

JOHN F. FOSTER, OF KANSAS CITY, KANSAS.

BALL-BEARING.

1,013,151.  Specification of Letters Patent.  Patented Jan. 2, 1912.

Application filed May 5, 1910, Serial No. 559,502. Renewed May 22, 1911. Serial No. 628,890.

*To all whom it may concern:*

Be it known that I, JOHN F. FOSTER, a citizen of the United States, residing at Kansas City, in the county of Wyandotte and State of Kansas, have invented certain new and useful Improvements in Ball-Bearings, of which the following is a specification.

This invention relates to ball-bearings, and my object is to produce a ball bearing which will operate efficiently and reliably, embodies the desirable features of simplicity, strength and durability and is composed of few parts susceptible of being easily and quickly assembled in operative relation.

To this end the invention consists in certain novel and peculiar features of construction and organization as hereinafter described and claimed; and in order that it may be fully understood reference is to be had to the accompanying drawings, in which—

Figure 1, is a view partly in side elevation and partly in central vertical section of a ball bearing embodying my invention. Fig. 2, is a central vertical transverse section of the bearing on the line II—II of Fig. 1. Fig. 3, is a section on the dotted line III of Fig. 2. Fig. 4, is a section on the line IV—IV of Fig. 1, with certain parts of said figure omitted. Fig. 5, is a detail perspective view of one of the spacing elements of the bearing. Fig. 6, is a detail perspective view of another of the spacing elements. Fig. 7, is a view similar to Fig. 1, of a modified type of construction. Fig. 8, is a section on the line VIII—VIII of Fig. 7. Fig. 9, is a detail perspective view of one of the spacing elements of a modified type of construction.

In the said drawings like reference characters identify corresponding parts in all the figures.

A collar consists of the rigid inner member 1, and an outer member or band 2, rigidly secured together, the outer member or band being of resilient material and annularly grooved internally and externally so as to produce a reduced portion 3 susceptible of flexing or springing slightly at such point under certain conditions hereinafter mentioned.

Concentrically surrounding the first-named collar is an outer collar consisting of a rigid outer member 4 and an inner member 5 secured within member 4 and of resilient material and annularly grooved internally and externally to produce centrally the reduced portion 6, susceptible of flexing or springing slightly at times, and fitting between said collars is a series of balls 7, the balls engaging the external groove of member 2 of the inner collar, and the internal groove of member 5 of the outer collar, the relation being such that the balls interlock the two collars together as regards lateral movement.

Engaging opposite sides of each ball are circular cups 8, and projecting from each cup is a bifurcated stem 9, and engaging the bifurcated stems of adjacent cups are spacing bars 10, grooved at their opposite edges to form flanges 11, capable of being swaged apart slightly for the purpose of interlocking the spacing bars with the cups and thus preventing independent lateral movement of said parts, the engagement of the cups with the balls guarding against independent endwise movement of said parts as will be readily understood by reference to Fig. 1. Between the cups said spacing bars are provided with laterally projecting arms 12 which project into the spaces between the collars at opposite sides of the ball races thereof, the ends of said arms being reduced to form tongues 13, flanked by shoulders 14, said tongues being bifurcated as at 15.

16 indicates a pair of rings arranged between and spaced from the collars at opposite sides of the ball race thereof, said rings by preference being of I-shape in cross section and at equi-distant points said rings are provided with openings 17, to receive the tongues 13, the said openings being of such size that the shoulders 14 shall bear against the inner faces of the rings as shown clearly in Fig. 3. When said members are so arranged, the tongues 13 are swaged apart slightly as shown in Fig. 2, to effectually lock the rings thereon and thus guard against any possibility of dislocation. It will be seen that by this construction, the cups and rings are locked in rigid relation and thus guard against any independent twisting movement of the former and consequently reliably maintain the balls in their original relation as long as they are in service.

In Sheet 2, the construction and arrangement of the parts is precisely the same as that described, except that the rings 16 are dispensed with and the spacing bars are not provided with the laterally projecting arms 12. In this construction it is obvious that there is a slight possibility after the parts have become worn through long service, of the cups having a slight lateral play or twisting action which obviously cannot take place with the construction shown by Sheet 1; though in many connections the type of construction illustrated by Sheet 2 will be preferred because it can be produced at less cost and for all practical purposes operates in such connections with the same efficiency. A bearing of this kind is applicable for use upon stationary or driven shafts. In the former case the inner collar will be secured rigidly to the shaft and the balls and outer collar will travel around the inner one. In the other case the outer collar will form the journal, that is will be stationary and the balls and inner collar will revolve.

In both types of construction the balls are of such proportion that should they lie one against the other they will fill half the annular ball-race and to secure the balls in place the collars are arranged concentrically so that the space between them at opposite sides of the adjacent channels shall be wide enough at the point where the collars are most distant from each other to admit the balls one at a time, the balls as inserted at such point rolling downward in the ball-race until all of them are in place. The balls are then successively spaced apart to permit the cups to be placed in position and when all of the cups are so arranged the collars are relatively adjusted to restore them to concentric relation. The adjacent pairs of cups are then successively spaced apart and the spacing bars are engaged therewith and swaged as hereinbefore explained to effect an interlocked relation between them and the stems of the cups.

In the construction shown by Sheet 1, in which provision is made through the rigid skeleton frame composed of the rings 16 and the spacing bars and cups for compelling the balls to always travel in exactly the same path, the collars may be provided with segmental notches 18 and 19 formed in members 2 and 5, to constitute an opening through which the balls and cups may be successively placed in position in the channels without disposing the collars in eccentric relation as explained, and in this connection it is obvious that if provision is made for inserting the balls and cups without disturbing the concentric relation of the collars a greater number of balls may be employed, it being apparent that the spacing bars may be proportionately shortened in order to accommodate a greater number of balls.

In the construction shown by Sheet 2, the use of the notches 18 and 19 is undesirable as any slight lateral movement of the balls in traveling around in the recess would result in their pounding on the corners produced at the points where the notches intersect the ball-race and in time result in injury to or breakage of the balls or chipping of members 2 and 5.

In the operation of the bearing any unevenness in the wear of one or more of the balls will be accommodated by yielding on the part of one or both of the resilient members of the collars and thus insure contact of the latter with all of the balls and guard against an unequal distribution of strain. As a result the life of the bearing will be materially longer as there will be less danger of any particular ball or balls being subjected to any strain and excessive pressure.

From the above description it will be apparent that I have produced a ball bearing possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. A ball bearing, comprising a pair of concentrically arranged collars spaced apart, the inner one having a circular channel in its periphery, and the outer one a circular channel in its inner face, the two channels conjointly forming a ball-race, balls arranged in said ball-race, a spacing bar arranged between adjacent balls, and cups arranged between each bar and pair of balls and engaging the latter and provided with transversely bifurcated stems receiving the ends of said bar, the ends of said bars being swaged in said stems.

2. A ball bearing, comprising a pair of concentrically arranged collars spaced apart, the inner one having a circular channel in its periphery, and the outer one a circular channel in its inner face, the two channels conjointly forming a ball-race, balls arranged in said ball-race, a spacing bar arranged between adjacent balls, cups mounted upon opposite ends of said bars and interposed between the same and said balls and engaging the latter, and a pair of rings arranged between the collars at opposite sides of the balls and connected and bearing a fixed relation to said bars.

3. A ball-bearing, comprising a pair of concentrically arranged collars spaced apart, the inner one having a circular channel in its periphery, and the outer one a circular channel in its inner face, the two channels conjointly forming a ball-race, balls arranged in said ball-race, a spacing-bar arranged between adjacent balls, and provided with oppositely projecting arms, cups mounted upon opposite ends of said bars and interposed between the same and said balls and engaging the latter, and a pair of rings arranged between the collars and opposite sides of the balls, and engaging and bearing a rigid relation to the said oppositely projecting arms.

4. A ball bearing, comprising a pair of concentrically arranged collars spaced apart, the inner one having a circular channel in its periphery, and the outer one a circular channel in its inner face, the two channels conjointly forming a ball-race, balls arranged in said ball-race, a spacing-bar arranged between adjacent balls and provided with oppositely projecting arms, cups mounted upon opposite ends of said bars and interposed between the same and said balls and engaging the latter, and a pair of rings mounted upon the opposite ends of the arms of said bars, said arms being swaged in said rings.

5. A ball bearing comprising a pair of concentrically arranged collars spaced apart, the inner one having a circular channel in its periphery, and the outer one a circular channel in its inner face, the two channels conjointly forming a ball-race, balls arranged in said ball-race, a spacing-bar arranged between adjacent balls, and provided with oppositely projecting arms, reduced at their ends to form shoulders and tongues, cups mounted upon opposite ends of said bars and interposed between the same and said balls and engaging the latter, and a pair of rings arranged between the collars and opposite sides of the balls and fitting upon said tongues and against said shoulders, said tongues being swaged on the rings.

6. A ball bearing, comprising an inner collar, consisting of a rigid inner member and a resilient outer member rigidly secured to the inner member and channeled to facilitate flexing or springing, and an outer collar consisting of a rigid outer member and a resilient inner member rigidly secured to the outer member and channeled to facilitate flexing or springing, and balls arranged between and engaging the channeled outer member of the inner collar and the channeled inner member of the outer collar.

7. A ball bearing, comprising an inner collar consisting of a rigid inner member and a resilient outer member rigidly secured to the inner member and channeled to facilitate flexing or springing, and an outer collar consisting of a rigid outer member and a resilient inner member rigidly secured to the outer member and channeled to facilitate flexing or springing, balls arranged between and engaging the channeled outer member of the inner collar and the channeled inner member of the outer collar, and spacing means engaging the balls and rotatable therewith around the inner collar.

8. A ball bearing, comprising an inner collar consisting of a rigid inner member and a resilient outer member, rigidly secured to the inner member and channeled to facilitate flexing or springing, and an outer collar consisting of a rigid outer member and a resilient inner member rigidly secured to the outer member and channeled to facilitate flexing or springing, balls arranged between and engaging the channeled outer member of the inner collar and the channeled inner member of the outer collar, spacing bars alternating with and arranged between the balls, and cups secured upon the opposite ends of each spacing bar and engaging the adjacent balls.

9. A ball bearing, comprising an inner collar consisting of a rigid inner member and a resilient outer member, rigidly secured to the inner member and channeled to facilitate flexing or springing, and an outer collar consisting of a rigid outer member and a resilient inner member rigidly secured to the outer member and channeled to facilitate flexing or springing, balls arranged between and engaging the channeled outer member of the inner collar and the channeled inner member of the outer collar, spacing bars between adjacent balls, cups engaging the balls and secured to opposite ends of the spacing bars, and a pair of rings arranged between the collars and bearing a rigid relation to the spacing bars.

In testimony whereof I affix my signature, in the presence of two witnesses.

JOHN F. FOSTER.

Witnesses:
 HELEN C. RODGERS,
 G. Y. THORPE.